United States Patent [19]
Farnworth

[11] Patent Number: 5,847,853
[45] Date of Patent: Dec. 8, 1998

[54] MODULATION AND DEMODULATION OF LIGHT TO FACILITATE TRANSMISSION OF INFORMATION

[75] Inventor: Warren M. Farnworth, Nampa, Id.

[73] Assignee: Micron Technology, Inc., Boise, Id.

[21] Appl. No.: 580,630

[22] Filed: Dec. 29, 1995

[51] Int. Cl.[6] .................................................. H04J 14/02
[52] U.S. Cl. ............................................ 359/124; 359/182
[58] Field of Search ................................. 359/126, 127, 359/133, 134, 160, 182, 180, 181, 188, 108, 107; 385/15, 24

[56] References Cited

U.S. PATENT DOCUMENTS

| | | |
|---|---|---|
| 4,135,202 | 1/1979 | Cutler . |
| 4,560,246 | 12/1985 | Cotter . |
| 4,561,117 | 12/1985 | Kuhn . |
| 4,602,223 | 7/1986 | Goeb et al. . |
| 4,680,767 | 7/1987 | Hakimi et al. . |
| 4,768,191 | 8/1988 | Polcer . |
| 4,775,972 | 10/1988 | Ih et al. . |
| 4,827,395 | 5/1989 | Anders et al. . |
| 4,831,662 | 5/1989 | Kuhn . |
| 4,913,547 | 4/1990 | Moran ...................................... 356/349 |
| 5,121,241 | 6/1992 | Veith . |
| 5,251,053 | 10/1993 | Heidemann . |
| 5,285,306 | 2/1994 | Heidemann . |
| 5,339,183 | 8/1994 | Suzuki .................................... 359/133 |
| 5,371,622 | 12/1994 | Khoe et al. . |
| 5,446,574 | 8/1995 | Djupsjobacka et al. . |
| 5,455,704 | 10/1995 | Mizuochi et al. . |
| 5,596,667 | 1/1997 | Watanabe ................................. 359/129 |
| 5,644,664 | 7/1997 | Burns et al. ................................ 385/2 |

OTHER PUBLICATIONS

Gilmore, Mike, *Fibre Optic Cabling Theory, design and installation practice*, pp. 11–27, 1991.

"Optoelectronic Interconnections", *Microelectronics Packaging Handbook*, pp. 437–441, 1989.

Mathieu, J.P., "Interference", *Optics Parts 1 and 2*, pp. 18–21, 1975.

Shimada, Sadakuni, "Introduction to coherent lightwave communications", *Coherent Lightwave Communications Technology*, pp. 1–3, 1995.

"Radiofrequency Communications: AM", Chapter 13, pp. 892–895, *The Art of Electronics*.

*Primary Examiner*—Rafael Bacares
*Attorney, Agent, or Firm*—Trask, Britt & Rossa

[57] ABSTRACT

A communication system including a light modulator system includes a laser that produces a high frequency carrier wave signal and a laser information signal source that produces a much lower frequency information signal. The carrier wave signal passes through a first pinhole in a screen to a light mixer cavity. The information signal passes through a second pinhole in the screen to the light mixer cavity, the signals being mixed in the light mixer cavity after passing through their respective pinholes. The resulting signal components include a sum of the carrier wave signal and the information wave signal. A pickup fibre is positioned and sized to receive and transmit only the sum of the carrier wave signal and the information wave signal. The pickup fibre is connected to the local end of a fibre optic cable. A light demodulator system at the remote end of the fibre optic cable includes a laser that produces a remote carrier wave signal that is mixed in another, similar light mixer cavity with the output of the fibre optic cable. The light signal components resulting from the mixing of the remote carrier wave signal and the fibre optic cable output signal are received by a light sensitive detector plate, which electronically outputs the components to a detector which is sensitive to the difference frequency between the remote carrier wave signal and the sum signal, to recover the information representative of the laser information signal.

43 Claims, 2 Drawing Sheets

MODULATION AND DEMODULATION OF LIGHT TO FACILITATE TRANSMISSION OF INFORMATION

BACKGROUND OF THE INVENTION

1. Field of the Invention

The invention relates to a system and method for modulating a combined light information signal and light carrier wave signal for transmission through an optical transmission link and demodulating the combined signal after reception to extract the transmitted information. More particularly, the invention relates to such a system and method of extremely simple and robust construction and which allow use of commercially available lasers and low frequency switching electronics for conversion of electronic domain information input signals to light signals and for retrieval of information from the light signals with reconversion to the electronic domain.

2. State of the Art

Optical communication systems allow information to be transmitted in the form of light. Fibre optic cables may be used to transmit the information from a transmitter to a receiver. Fibre optic cables can transmit light at extremely high speed and with relatively small power loss.

Referring to FIG. 1, a typical fibre optical cable consists of an optical core 14 surrounded by an optical cladding 16. The light is transmitted through core 14. As used herein, "light" refers to electromagnetic radiation that may be effectively transmitted through fibre optic cable and associated components, or other optic transmission systems known or contemplated in the art.

All materials that allow the transmission of electromagnetic radiation including light have an associated refractive index n, which is the ratio of the speed of light in a vacuum to the speed of light in the material. The speed of light in a vacuum is normalized to 1. The speed of light in a vacuum is constant regardless of the wavelength of the light. By contrast, the speed of light in a material is a function of wavelength and the structure of the material. Accordingly, the refractive index is a function of the wavelength of the light and the structure of the material.

Refraction refers to bending of light due to variations in the refractive index. As a ray of light passes from one material (or a vacuum) to another material, it is possible for the ray to refract, reflect, or partially refract and partially reflect. (The ray may also be partially absorbed.) Refracted rays are sometimes called transmitted rays, which term will be used herein to avoid confusion of subscripts.

The following three laws govern the relationship between incident, reflected, and transmitted (refracted) rays. First, the incident, reflected, and transmitted rays all reside in a plane, known as the plane of incidence, which is normal to the interface of the materials. Second, the angle of incidence $\theta_I$ equals the angle of reflection $\theta_R$, where each angle is measured with respect to a line normal to the interface. Third, the angle of incidence $\theta_I$ and the angle of transmittance $\theta_T$ are related by Snell's law shown in equation (1), below:

$$n_I \sin \theta_I = n_T \sin \theta_T \qquad (1),$$

where $n_I$ is the refractive index of the material through which the incident ray travels, $n_T$ is the refractive index of the material through which the transmitted ray travels, $\theta_I$ is the angle of the incident ray with respect to the normal, and $\theta_T$ is the angle of the transmitted ray with respect to the normal.

An example of refraction is shown in FIGS. 2A and 2B. Referring to FIGS. 2A and 2B, a ray travels from Material A, having refractive index $n_I$, to Material B, having a refractive index $n_T$. The ratio of the angle of incidence $\theta_I$ to the angle of transmittance $\theta_T$ is governed by Snell's law, shown in equation (1). Generally, where $n_T > n_I$ (as in FIG. 2A), $\theta_T < \theta_I$. Where $n_T < n_I$ (as in FIG. 2B), $\theta_T > \theta_I$. (Of course, a larger $\theta_I$ also results in a larger $\theta_T$.) At $\theta_T = 90°$, $\theta_I$ is defined to be at critical angle, denoted $\theta_C$. The critical angle $\theta_C$ is defined in equation (2), below:

$$\theta_C = \sin^{-1}(n_T/n_I) \qquad (2).$$

For $\theta_I > \theta_C$, all of the incident ray is totally internally reflected, remaining in the incident medium. An ideal fibre optic cable has total internal reflection, which leads to a relatively small amount of loss in the transmission of light through the cable.

Referring to FIG. 3, one end of fibre optic cable 10 interfaces with air, which has a refractive index $n_1$ (which happens to be about 1.00027). Core 14 has a refractive index $n_2$, where $n_2 > n_1$. Cladding 16 has a refractive index $n_3$. Dashed lines show the normal with respect to the air-core interface and the core-cladding interface. An incident ray hits the air-core interface at angle $\theta_{I1}$. The transmitted (refracted) ray is referred to as ray TI to designate the ray as both a transmitted ray with respect to the air-core interface and an incident ray with respect to the core-cladding interface. The angle of transmittance $\theta_T$ may be derived according to Snell's law, shown in equation (1).

An angle of incidence $\theta_{I2}$ inside core 14 equals 90° minus $\theta_T$. If $\theta_I > \theta_C$, there will be total internal reflection and ray TI will continue to transmit through core 14 at angle $\theta_{I2}$ until another interface is reached. Further, there is no loss of radiated power at the reflection (although there is loss as the light passes through core 14).

If $\theta_I$ is too large, $\theta_{I2}$ cannot be greater than $\theta_C$, and there will not be total internal reflection. The maximum incident angle $\theta_{MAX}$ is derived in equation (3), below:

$$\theta_{MAX} = \sin^{-1}((1/n_1)(n_2^2 - n_3^2)^{1/2}) \qquad (3),$$

where $n_1$, $n_2$, and $n_3$ are the refractive indices defined above in connection with FIG. 3. Accordingly, if $\theta_I > \theta_{MAX}$, there will not be total internal reflection.

Interference refers to the consequence which arises when two light waves starting from the same point source or from two identical point sources arrive at some point P after having travelled two trajectories with different lengths. Generally, the two light waves have the same frequency, but different phases at the time they reach point P. However, the inventor has discovered that it is possible to employ the interference phenomenon with laser light waves of different frequencies and from different sources, as the description of the present invention will hereinafter show.

Modulation is used to impress information from one signal into another signal to create a modulated signal. There are various types of modulation, including amplitude modulation and frequency modulation.

Amplitude modulation is a method of transmitting an information signal by superimposing it on a carrier signal which has a much higher frequency. Consider the following simple example. A carrier signal $\cos \omega_C t$ is varied in amplitude by a modulating information signal $\cos \omega_M t$, where $\omega_M$ is much less than $\omega_C$. The resulting modulated signal $I_{Mod}$ is shown in equation (4), below:

$$I_{Mod} = (1 + M \cos \omega_M t) \cos \omega_C t \qquad (4),$$

where M is the modulating index, which is less than or equal to 1, $\omega_M=2\pi f_m = 2\pi/\lambda_M$, and $\omega_C=2\pi f_C=2\pi/\lambda_C$. $I_{Mod}$ may be rewritten as in equation (5), below:

$$I_{Mod}=\cos \omega_C t + m/2 \ (\cos((\omega_C+\omega_M)t + \cos((\omega_C-\omega_M)t) \qquad (5).$$

Equation (5) illustrates that the modulated carrier has power at frequencies $\omega_C$, $\omega_C+\omega_M$, and $\omega_{C-\omega M}$. In amplitude modulation, the frequency of the information signal remains constant while the amplitude varies to convey information. In frequency modulation, the frequency of the modulated signal varies, depending on the frequency of the information signal.

Where the information (modulating) signal is a complex waveform f(t), the amplitude modulated waveform may be $(K+f(t)) * \cos \omega_C t$, where K is a constant that is large enough such that K+f(t)) is never negative.

In many circumstances, the modulated signal $I_{Mod}$ can be transmitted more easily and efficiently than can the information signal $\cos \omega_M t$. At the conclusion of the transmission, a receiver strips the carrier wave, leaving only the information wave.

Systems are known in the art to modulate and demodulate light signals for information transmission purposes. However, such state-of-the-art systems are complex, expensive and require relatively sophisticated electronic processing to provide a modulated light output signal and to retrieve an electronic signal at the receiving end of the transmission.

SUMMARY OF THE INVENTION

The invention relates to a light communication system for transmitting modulated information. The system may include a source of a first laser light signal containing information and a source of a second laser light signal suitable for use in modulation with the first laser light signal. The first and second laser light signals may be mixed in a local mixer so as to create a multi-component local mixed laser light signal. A receiver element, such as an optical fibre pickup, may be sized and positioned to receive only one of the light signal components emanating from the mixer, such as the frequency summation component. The mixer may include a screen or mask with laterally-spaced or offset pinholes or slits through which the first and second light signals are respectively passed and a cavity in which the passed first and second light signals are mixed through overlapping, similar to the creation of an interference pattern.

The signal component received by the receiver element may be further transmitted through a light transmission link, such as a fibre optic cable, to a remote location. The transmission link may include one or more amplifiers as known in the art, particularly if the signal component is to be transmitted over substantial distances.

The invention may further include a demodulating system for the transmitted signal component that includes a source of a third laser light signal and a remote light mixer at the receiving end of the light transmission link. The third laser light signal and the signal component transmitted through the light transmission link are mixed in a remote light mixer including a screen or mask with pinholes through which the third laser light signal and transmitted signal component pass into a mixing cavity, as previously described, to create a remote mixed signal with a plurality of components.

The demodulating system may also include a light sensitive detector plate that detects the remote mixed signal components and converts them to the electronic domain. A remote detector responsive to a component of the remote mixed signal from the detector plate then produces an electronic output signal corresponding to the information content of the first laser light signal.

The invention is not limited to transmitting and detecting the frequency summation component of the mixed first and second signals. If a different component is transmitted and detected (such as the frequency difference component), a similar procedure may be performed by the remote detector to recover the information of the first laser light signal.

The local receiver, while preferably a pickup fibre, may include another frequency-selective electromagnetic receptor as known in the art.

The present invention may be characterized by its simplicity and robust construction, as well as its ability to employ relatively inexpensive, off-the-shelf, low-frequency electronic switching components and commercially available lasers.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE PREFERRED EMBODIMENTS

Figure 1:
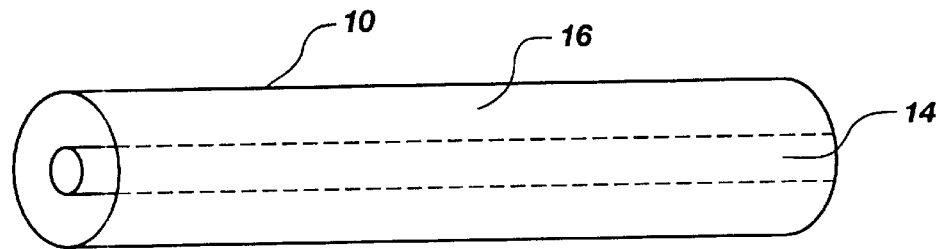
FIG. 1 shows a perspective view of a section of fibre optic cable.
Figure 2A:
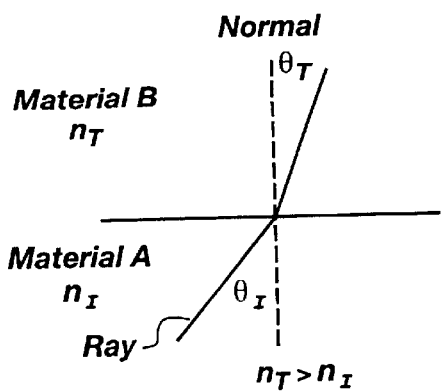
FIG. 2A illustrates refraction in the case in which the refractive index of the base medium is less than that of the adjacent medium.
Figure 2B:
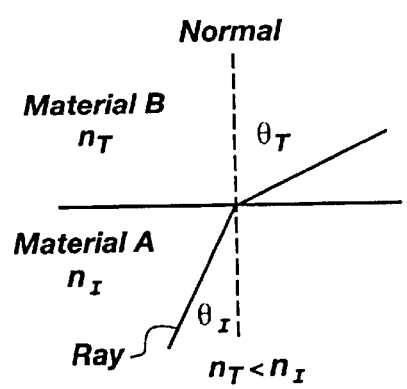
FIG. 2B illustrates refraction in the case in which the refractive index of the base medium is greater than that of the adjacent medium.
Figure 3:
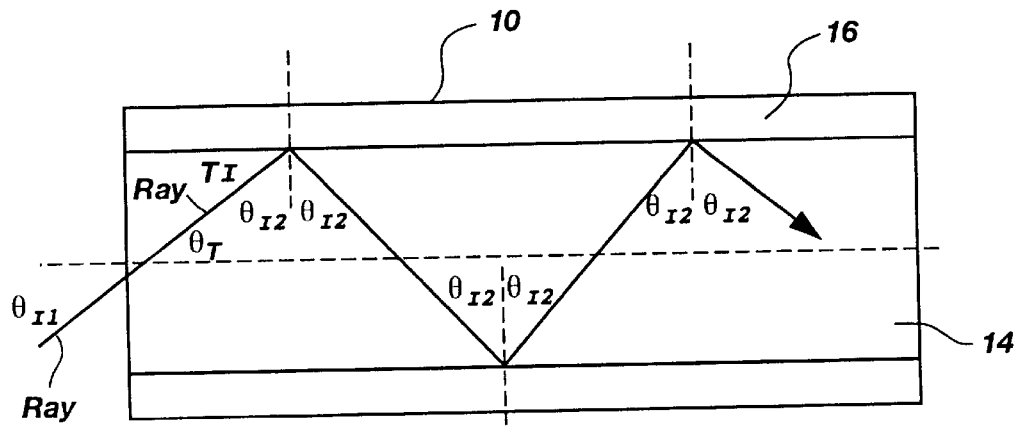
FIG. 3 illustrates total internal reflection in a fibre optic cable.
Figure 4:
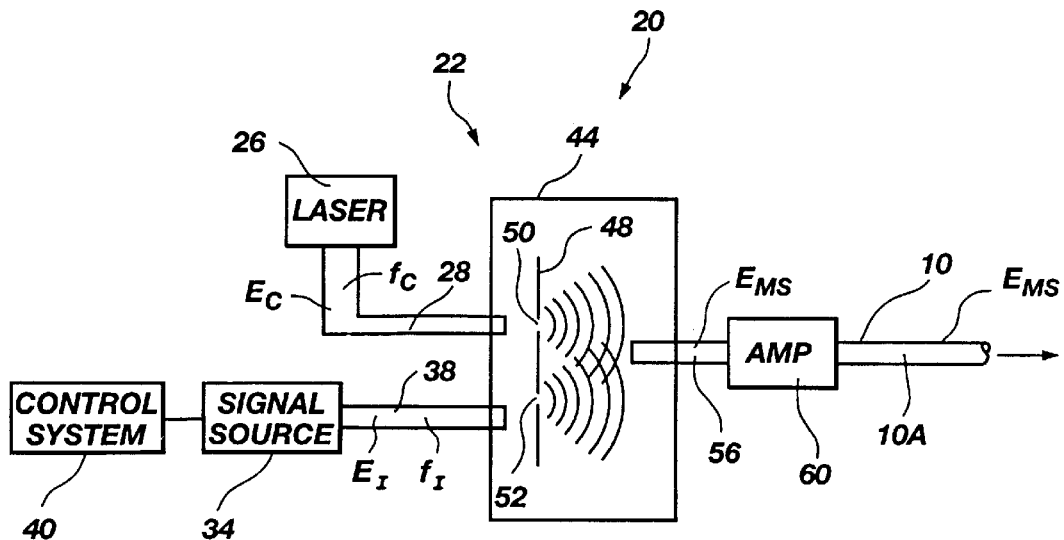
FIG. 4 is a schematic representation of a light modulator system according to a preferred embodiment of the present invention.

Referring to FIG. 4, a communication system 20 according to the invention includes a laser light modulator system 22, which provides a modulated laser light signal to a fibre optic transmission cable 10. Communication system 20 also includes a laser light demodulator system 24 shown in FIG. 5. Cable 10 is part of a fibre optic transmission link between light modulator system 22 and light demodulator system 24. Cable 10 includes a local end 10A (shown in FIG. 4) and a remote end 10B (shown in FIG. 5), as well as an intermediate portion linking ends 10A and 10B (not shown).

Returning to FIG. 4, laser 26 provides a light signal $E_C$ having a frequency $f_C$ to an optic fibre 28, the frequency subscript C referring to "carrier." Laser 26 may be a commercially-available diode laser, and frequency $f_C$ is tunable within a range of frequencies. The laser carrier signal may be called a light signal, an optic signal, or merely light. Laser 26 may be termed the carrier wave laser. The signals produced by lasers are coherent. Coherence has various aspects, but includes having virtually all energy of the output signal at a single frequency or within an extremely narrow band of frequencies. Coherence permits maintenance of the information and carrier wave light or grids employed in the invention within tight frequency bounds for modulation and demodulation.

An information signal source 34 provides a laser light signal $E_I$ having a frequency $f_I$ to an optic fibre 38, where the frequency subscript I refers to "information." Information signal source 34 comprises a means for converting a relatively low frequency electronic domain signal received from control system 40 to a light signal transmissible through optic fibre 38, as known in the art. For example, an electrooptic or magnetooptic modulator may serve as the electronic-to-light signal conversion means. Accordingly, signal $E_I$ is also referred to as a light signal. Thus, in accordance with the invention, $E_I$ is representative of signals and frequencies which will not transmit through an optic fibre but which, when modulating light signal $E_C$, can, in fact, be so transmitted.

Merely by way of example and not limitation, the signals $E_C$ and $E_I$ are defined in equations (6) and (7), below:

$$E_C = A \cos \omega_C t \qquad (6),$$

where $\omega_C = 2\pi * f_C$, and A is the amplitude. For convenience A equals 1 and will be ignored.

$$E_I = M \cos \omega_I t \qquad (7),$$

where $\omega_I = 2\pi * f_I$, and M is a modulation index that is less than or equal to 1.

The maximum magnitude of M may be considerably greater than the magnitude of A. In the case of amplitude modulation, the value of M varies to convey information. In the case of frequency modulation, M=1 and the frequency $f_I$ varies to convey information. In either case, the frequency $f_I$ is substantially lower than frequency $f_C$. In this context, "substantially" means within a range between a maximum and minimum spread of frequencies $f_C$ and $f_I$. The maximum spread in frequency modulation (audio) transmission is presently about 4400 to 1. The minimum spread is determined by the sensitivity of the receiver. The maximum spread is limited by the transmission spectrum of the optical fibre. Additionally, different frequencies travel at different velocities in the fibre, with the result that too great a spread between $f_C$ and $f_I$ will cause shifting of the information, commonly known as "smearing." With a standard ≈200 THz signal, an amplitude modulation at a minimum of 26.5 to 1 cycles of carrier to information signal provides a baud rate of over 7 THz. While such a baud rate is obviously unnecessary for most applications, it would be possible to realize such a rate using microwave carrier to signal ratios. (For example, the ratio of an AM band carrier signal of 720 kHz versus an information signal of 20 kHz.) The frequency $f_C$ should be high enough for the resulting modulated signal to be transmitted by fibre optic cable 10.

Information signal source 34 may be a laser or other source of coherent light. The amplitude (preferable) or frequency of signal $E_I$ is dictated by a control system 40, which may be one of various suitable sending instrumentation systems or a computer. For example, control system 40 may comprise an electronic signal-generating apparatus, such as a telecommunications system or a computer, which generates an information signal (audio, video, facsimile, electronic data, etc.) in or convertible to the digital domain for convenience of transmission.

Lasers are preferred for use as the light sources in the present invention as being suitable for use with relatively low frequency electronic components. An oscillator could drive, or gate, an LED to create a controlled frequency of pulsing that could be modulated (amplitude) by an information beam. However, such an approach would require very high frequency (and thus costly) generation components, which is a drawback the present invention avoids.

Signals $E_C$ and $E_I$ are transmitted through optic fibres 28 and 38, respectively, to light mixer cavity 44. Light mixer cavity 44 comprises a block of optically-transmissive material for the light frequencies passing therethrough, such as air, other gases or gas mixtures, as well as solid materials known in the art. Light mixer cavity 44 contains a screen or mask 48 opaque to the incoming light signal frequencies from optic fibres 28 and 38. Screen 48 is transversely oriented to the associated ends of optic fibres 28 and 38 and includes laterally-spaced or offset pinholes or slits 50 and 52 (such as are commonly used to create an interference pattern from a single source). Optic fibre 28 is pointed at pinhole 50; optic fibre 38 is pointed at pinhole 52. The widths of pinholes 50 and 52 may be at some quantized level, which may be between a quarter of a wavelength and a wavelength of the signals $E_C$ and $E_I$, respectively. The size of pinholes 50 and 52 is greatly exaggerated for purposes of illustration.

After having passed through pinholes 50 and 52, light signals $E_C$ and $E_I$ mix (i.e. overlap) as shown in FIG. 4. Under the definition of interference provided above, the overlapping of signals $E_C$ and $E_I$ is not strictly an interference as defined in the art because $E_C$ and $E_I$ do not start from the same point source or from two identical point sources. Therefore, the term "mixing" will be used herein to describe this phenomenon.

The modulation and demodulation functions employed in the invention are effected through the screen and pinhole system so that the two light signals transmitted through the pinholes create a non-linear function reflective of the information signal being transmitted.

Signals $E_C$ and $E_I$ in light mixer cavity 44 contain four components: (1) $E_C$ alone, (2) $E_I$ alone, (3) a modulated sum $E_{MS}$ of $E_C$ and $E_I$, and (4) a modulated difference $E_{MD}$ between $E_C$ and $E_I$.

A pickup optic fibre 56 or other suitable light receptor is positioned in the path of the overlapping waves of signals $E_C$ and $E_I$. Pickup fibre 56 is positioned distant enough from screen 48 for the two light signals to overlap and sized such that it picks up substantially only the modulated sum $E_{MS}$ component for transmission. The size of pinholes 50 and 52 may be varied in coordination with placement of pickup fibre 56 for optimum performance.

A pumped crystal amplifier 60 as known in the art receives that portion of signal $E_{MS}$ that is transmitted by pickup fibre 56. Pumped crystal amplifier 60 may be a passive crystal of off-the-shelf design that is commonly used in transatlantic cables for periodic signal amplification for long distance optic fibre. Additional pumped crystal amplifiers may be used as appropriate in the case of long distance optic fibre transmission. The intermediate portion of fibre optic transmission cable 10 (not shown), as well as the remote end of fibre optic transmission cable 10B, are of the same size as local end 10A, so as to transmit only the modulated sum frequency to a light demodulator system 24 at the receiving end of the transmission.

Figure 5:
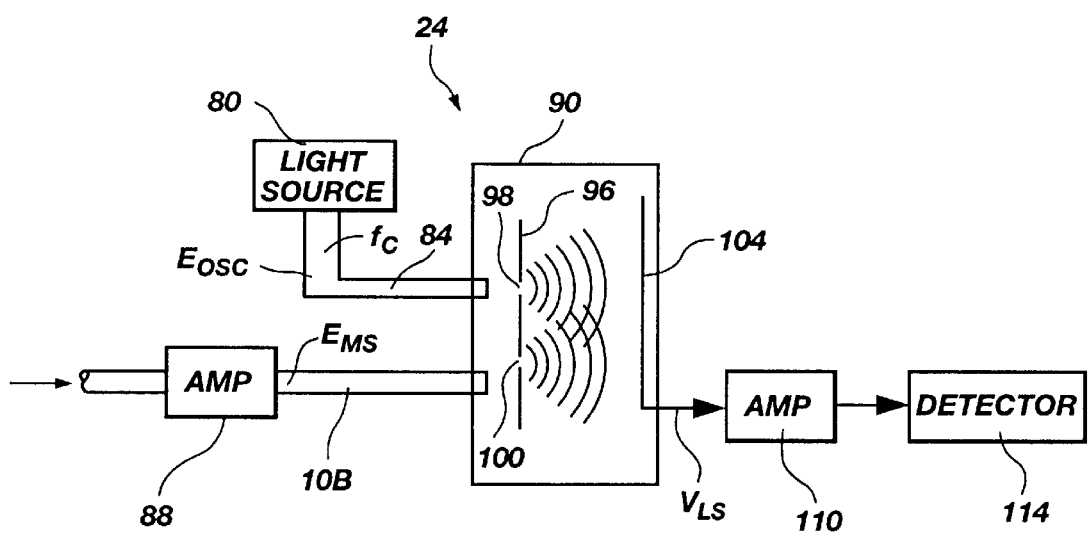
FIG. 5 is a schematic representation of a light demodulator system according to a preferred embodiment of the present invention.

Referring to FIG. 5, a light demodulator system 24 includes receiver fibre optic transmission cable 10B (carrying $E_{MS}$) and a laser 80. Laser 80 provides a laser light signal $E_{OSC}$ having a frequency $f_{OSC}$ to an optic fibre 84, where the frequency subscript OSC refers for convenience by analogy to an oscillating signal at the demodulation end of the system. As with laser 26, laser 80 may be an off-the-shelf, tunable diode laser. While it is preferred that $f_{OSC}$ may equal $f_C$ to reduce noise to the maximum extent, it is not required. If $f_{OSC}$ does not equal $f_C$, more sophisticated processing capabilities may be required in the demodulator system processing electronics.

Signals $E_{OSC}$ and $E_{MS}$ are received by a light mixer cavity 90, which is similar to light mixer cavity 44. Signal $E_{MS}$ may be amplified, as with a pumped crystal amplifier 88, before entering light mixer cavity 90. Light mixer cavity 90 also includes a screen or mask 96 with pinholes 98 and 100, corresponding to the construction of mask 48. Optic fibre 84 is aimed at pinhole 98; optic fibre 10B at pinhole 100. Signals $E_{OSC}$ and $E_{MS}$, passing through their respective pinholes and subsequently overlapping, produce four signal components therefrom: (1) $E_{OSC}$, (2) $E_{MS}$ (3) the modulated sum of $E_{OSC}$ and $E_{MS}$, and (4) the difference between $E_{OSC}$ and $E_{MS}$ which, if $E_{OSC}$ is equal to $E_C$, will equal $E_I$. The four components are received by a light sensitive detector plate 104 as known in the art, which receives all four signal components.

Light sensitive detector plate 104 produces an electronic domain signal $V_{LS}$, which is received by amplifier 110. As with the modulation end of the communication system of the invention, the size of pinholes 98 and 100 and the placement of detector plate 104 may be varied for optimum performance. A detector 114 is sensitive only to the difference frequency signal component received from amplifier 110 and produces an electronic output signal, the amplitude of which varies, mimicking the original, relatively low-frequency, information signal from control system 40, allowing relatively low frequency electrical circuitry to amplify and reroute the signal locally to its intended destination for processing. Thus, the original information signal can readily be recovered from the signal received by the detector. The lower frequency electrical circuitry for handling the difference frequency is far less expensive than higher frequency circuitry required to handle a high frequency light signal such as a carrier wave light signal.

Exemplary applications for communication system 20 include local area networks, wide area networks, and local and long distance telecommunications.

Of course, in many, if not all, applications of the present invention, it is expected that a local light demodulator system would accompany the local light modulator system such that information could be transmitted in both directions. It is expected that, in most cases, a modulator/transmitter would also be a demodulator/receiver or a transceiver, with the functions of lasers 26 and 80 as illustrated and described herein performed by a single laser suitably linked by prism and optic fibres into both the modulation and demodulation portions of an integrated transceiver system.

Although only amplitude and frequency modulation are discussed above, it will be apparent to those skilled in the art that various other modulation techniques may be employed, such as phase modulation. This would, however, require one to send the carrier wave down the same optical fibre as the carrier wave impressed with the information signal, e.g., mixing would not be employed for the addition of a carrier wave signal. Phase detection could also be employed at the receiving end of the communication system.

It is expected that existing off-the-shelf parts are used in fabricating the apparatus of the invention wherever possible, there being no need for extensive use of custom-designed laser and optic transmission and amplification components.

As used in the claims, the terms "connect," "connectable," or "connected to" are not necessarily limited to a direct connection. For example, light sensitive detector plate 104 is connected to detector 114, although it may not be directly connected, due to the presence of an intervening amplifier.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A light communication system for transmitting modulated information, comprising:
   a source of a light signal containing information to be transmitted;
   a source of a higher frequency carrier light signal suitable for use in modulation with the information light signal;
   a light mixer to mix the information and carrier light signals to create a mixed light signal, wherein said light mixer utilizes a cavity to receive the information and carrier light signals; and
   a receiver element to receive a component of the mixed light signal for transmission to a remote location via a light transmission link.

2. The system of claim 1 in which the mixed light signal includes a modulated sum component of the information and the carrier light signals, and the mixed light signal component received from the receiver element is the modulated sum component.

3. The system of claim 1 in which the light mixer includes a mask having a first pinhole through which the information light signal is aimed and a second pinhole through which the carrier light signal is aimed.

4. The system of claim 3 in which the information light signal and the carrier light signal are aimed in a mutually parallel and laterally offset relationship, and the mask is oriented transversely to the light signals.

5. The system of claim 1 in which the receiver element is a pickup optic fibre sized to transmit substantially only the mixed light signal component to the transmission link.

6. The system of claim 1, further including an amplifier for receiving the mixed light signal component from the receiver element and amplifying the mixed light signal component for transmission to said remote location via the light transmission link.

7. The system of claim 6, further including said light transmission link comprising a fibre optic cable in communication with the receiver element through the amplifier.

8. The system of claim 1 in which the light signal sources are lasers.

9. A light communication system for receiving modulated information in the form of a mixed light signal component carrying the information, comprising:
   a source of a light signal;
   a light mixer to mix the light signal and the received mixed light signal component to produce a mixed light signal, wherein said light mixer utilizes a cavity to receive the light signal and the received mixed light signal component; and
   a detector responsive to a component of the mixed light signal for producing a signal representative of the information carried by the received mixed light signal component.

10. The system of claim 9 in which the detector is responsive to a difference component in the mixed light signal.

11. The system of claim 9 in which the light mixer includes a mask having a first pinhole through which the light signal is aimed and a second pinhole through which the received mixed light signal component is aimed.

12. The system of claim 11 in which the light signal and the received mixed light signal component are aimed in a mutually parallel and laterally offset relationship, and the mask is oriented transversely to the light signals.

13. The system of claim 9 further comprising a light sensitive detector plate that detects the mixed light signal and provides components of the mixed light signal to the detector.

14. A light communication system for transmitting and receiving modulated information, the system comprising:
   a source of a light signal containing information to be transmitted;
   a source of a second higher frequency carrier light signal suitable for use in modulation with the information light signal;
   a transmitter light mixer for mixing the information and carrier light signals to create a mixed light signal including a summation frequency component of the information and carrier light signals;
   a receiver element for receiving the summation frequency light signal component and passing the summation frequency light signal component to a light transmission link;
   a light transmission link for transmitting the summation frequency light signal component to a remote location;
   a source of a light signal of a different frequency than the summation frequency light signal component to a remote location;
   a receiver light mixer at the remote location for mixing the different frequency light signal and the summation frequency light signal component to create a second mixed light signal; and
   a detector at the remote location responsive to a difference component of the second mixed light signal for producing a signal representative of the information of the information light signal.

15. The system of claim 14 in which the transmitter light mixer includes a mask having a first pinhole through which the information light signal is aimed and a second pinhole through which the carrier light signal is aimed.

16. The system of claim 14 in which the receiver light mixer includes a mask having a first pinhole through which the different frequency light signal is aimed and a second pinhole through which the summation frequency light signal component is aimed.

17. The system of claim 14 in which the receiver element is a pickup optical fibre sized to transmit substantially only the summation frequency light signal component to the transmission link.

18. The system of claim 14 further comprising a light sensitive detector plate that detects the second mixed light signal and provides components of the second mixed light signal to the detector.

19. A light communication system for transmitting and receiving modulated information, the system comprising:
   means for providing a first light signal containing information and a second light signal suitable for use in modulation with the first light signal;
   local mixing means for mixing the first and second light signals to create a local mixed signal;
   light transmission means for receiving a component of the local mixed light signal and for transmitting the component of the local mixed light signal to a remote location;
   a source of a third light signal of a different frequency than the local mixed light signal component at the remote location;
   remote mixing means for mixing the third, different frequency light signal and the local mixed light signal component received through the light transmission means to create a remote mixed light signal; and
   remote detection means responsive to a component of the remote mixed light signal to thereby produce a signal representative of the information of the first light signal.

20. A light communication system for transmitting and receiving information contained in a first light signal which is modulated with a second light signal, the system comprising:
   a local light mixer in which the first and second light signals are mixed to create a local mixed signal, the local light mixer comprising a light cavity to receive the first and second light signals for mixing;
   a remote source of a third light signal;
   a remote light mixer in which the third light signal and a signal component of the local mixed signal are mixed to produce a remote mixed signal; and
   a remote detector responsive to the remote mixed signal to produce a signal representative of the information contained in the first light signal.

21. A light modulator for use in a light communication system used for transmitting information over a light transmission link, the system comprising:
   a first light source providing a first light signal having a first frequency;
   a second light source providing a second light signal of a second frequency which is substantially higher than the first frequency;
   a light signal mixer for receiving the first and second light signals and in which the first and second light signals are mixed to produce a mixed light signal, the light signal mixer comprising a light cavity to receive the first and second light signals for mixing; and
   a receiver element for receiving a component of the mixed light signal and providing it to the light transmission link for transmission.

22. A light demodulator for use in a light communication system used for transmitting information, the system comprising:
   a first light source providing a first light signal having a first frequency;
   a second light source comprising a transmission link through which is received a mixed light signal component of a light signal containing information and a second light signal of a second frequency which is substantially higher than the frequency of the information light signal, said received mixed light signal component having been mixed at a location remote from the light demodulator and transmitted to said demodulator through the transmission link;
   a light signal mixer to receive the first light signal and the received mixed light signal component and in which the first light signal and mixed light signal component are mixed to produce a demodulation mixed light signal; and
   a detector responsive to the demodulation mixed light signal to produce a signal representative of the information in the information light signal.

23. A method for modulating and demodulating light information, comprising:

providing a first light signal containing information;

providing a second light signal suitable for use in modulation with the first light signal;

mixing the first and second light signals to create a local mixed light signal including a plurality of components;

transmitting a component of the local mixed light signal over a light transmission link to a remote location;

providing a third light signal at the remote location;

mixing the third light signal and the local mixed light signal component at the remote location to produce a remote mixed light signal including a plurality of components; and detecting a component of the remote mixed light signal to retrieve the information of the first light signal.

24. The method of claim 23, wherein said transmitted component comprises a local mixed signal summation component.

25. The method of claim 23, wherein said detected component comprises a remote mixed signal difference component.

26. A method of modulating information carried by light, comprising:

generating a first light signal of a first frequency, said first light signal carrying information;

generating a second light signal of a second, higher frequency than the first frequency;

mixing the first and second light signals upon substantially simultaneous arrival thereof to form a mixed light signal with a component characterized by both the first and second light signals; and receiving substantially only the characterized mixed light signal component for transmission to a remote location.

27. The method of claim 26, wherein said characterized component comprises a summation component.

28. A method of demodulating information carried by light, comprising:

receiving a mixed light signal component from a light transmission link, wherein said received component is characterized by a first light signal at a first frequency, the first light signal carrying information, and by a second light signal of a second, higher frequency than the first frequency;

generating a third light signal of a frequency different from that of the received mixed light signal component;

mixing the received mixed light signal component with the third light signal to form a demodulation mixed light signal with a component characterized by both the received mixed light signal component and the third light signal;

detecting the demodulation mixed light signal component; and retrieving therefrom the information carried by the first light signal.

29. The method of claim 28, wherein the detected demodulation mixed light signal component comprises a difference component.

30. A light communication system for transmitting modulated information, comprising:

a source of a light signal containing information to be transmitted;

a source of a higher frequency carrier light signal suitable for use in modulation with the information light signal;

a light mixer for mixing the information and carrier light signals to create a mixed light signal, said light mixer comprising a mask having a first pinhole through which the information light signal is aimed and a second pinhole through which the carrier light signal is aimed prior to mixing; and a receiver element for receiving a component of the mixed light signal for transmission to a remote location via a light transmission link.

31. The system of claim 30 in which the mixed signal includes a modulated sum component of the information and the carrier light signals, and the mixed light signal component received by the receiver element is the modulated sum component.

32. The system of claim 30 in which the information light signal and the carrier light signal are aimed in a mutually parallel and laterally offset relationship, and the mask is oriented transversely to the light signals.

33. The system of claim 30 in which the receiver element is a pickup optic fibre sized to transmit substantially only the mixed light signal component to the transmission link.

34. The system of claim 30, further including an amplifier for receiving the mixed light signal component from the receiver element and amplifying the mixed light signal component for transmission to said remote location via the light transmission link.

35. The system of claim 34, further including said light transmission link comprising a fibre optic cable in communication with the receiver element through the amplifier.

36. The system of claim 30 in which the light signal sources are lasers.

37. A light communication system for receiving modulated information the the form of a mixed light signal component carrying the information, comprising:

a source of a light signal;

a light mixer for mixing the light signal and the received mixed light signal component to produce a mixed light signal, said light mixer comprising a mask having a first pinhole through which the light signal is aimed and a second pinhole through which the received mixed light signal component is aimed; and a detector responsive to a component of the mixed light signal for producing a signal representative of the information carried by the received mixed light signal component.

38. The system of claim 37 in which the detector is responsive to a difference component in the mixed light signal.

39. The system of claim 37 in which the light signal and the received mixed light signal component are aimed in mutually parallel and laterally offset relationship, and the mask is oriented transversely to the light signals.

40. A light communication system for receiving modulated information in the form of a mixed light signal component carrying the information, comprising:

a source of a light signal;

a light mixer for mixing the light signal and the received mixed light signal component to produce a mixed light signal;

a detector responsive to a component of the mixed light signal for producing a signal representative of the information carried by the received mixed light signal component; and a light sensitive detector plate to detect the mixed light signal and provide components of the mixed light signal to the detector.

41. The system of claim 40 in which the detector is responsive to a difference component in the mixed light signal.

42. The system of claim 40 in which the light mixer includes a mask having a first pinhole through which the light signal is aimed and a second pinhole through which the received mixed light signal component is aimed.

43. The system of claim 42 in which the light signal and the received mixed light signal component are aimed in a mutually parallel and laterally offset relationship, and the mask is oriented transversely to the light signals.

* * * * *

UNITED STATES PATENT AND TRADEMARK OFFICE
CERTIFICATE OF CORRECTION

PATENT NO. : 5,847,853
DATED : December 8, 1998
INVENTOR(S) : Warren M. Farnworth It is certified that error appears in the above-identified patent and that said Letters Patent is hereby corrected as shown below:

Column 1,
Line 13, change "allow" to -- allows --
Line 62, change "n," to -- $n_1$ --

Column 6,
Line 1, delete "an LED" insert -- a light emitting diode (LED) --

Column 7,
Line 12, after "98;" insert -- the remote end of --
Line 26, change "difference" to -- different --

Signed and Sealed this

Sixth Day of April, 2004

JON W. DUDAS
*Acting Director of the United States Patent and Trademark Office*